(12) United States Patent
Eichenberger et al.

(10) Patent No.: US 8,468,508 B2
(45) Date of Patent: Jun. 18, 2013

(54) PARALLELIZATION OF IRREGULAR REDUCTIONS VIA PARALLEL BUILDING AND EXPLOITATION OF CONFLICT-FREE UNITS OF WORK AT RUNTIME

(75) Inventors: Alexandre E. Eichenberger, Yorktown Heights, NY (US); Yangchun Luo, Yorktown Heights, NY (US); John K. O'Brien, Yorktown Heights, NY (US); Xiaotong Zhuang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 12/576,717

(22) Filed: Oct. 9, 2009

(65) Prior Publication Data

US 2011/0088020 A1 Apr. 14, 2011

(51) Int. Cl.
*G06F 9/45* (2006.01)
(52) U.S. Cl.
USPC .......... 717/149; 717/150; 717/153; 717/159; 717/160
(58) Field of Classification Search
USPC ........................................................ 717/149
See application file for complete search history.

(56) References Cited

U.S. PATENT DOCUMENTS

| 6,708,331 | B1 | 3/2004 | Schwartz | |
|---|---|---|---|---|
| 7,076,777 | B2 | 7/2006 | Srinivasan | |
| 7,171,544 | B2 | 1/2007 | Bera | |
| 8,082,545 | B2 * | 12/2011 | Prakash | 718/104 |
| 8,095,920 | B2 * | 1/2012 | Liao et al. | 717/140 |
| 2007/0169059 | A1 | 7/2007 | Halambi et al. | |
| 2008/0052689 | A1 * | 2/2008 | Archambault et al. | 717/140 |
| 2008/0127146 | A1 * | 5/2008 | Liao et al. | 717/150 |
| 2010/0306752 | A1 * | 12/2010 | Bordelon et al. | 717/149 |
| 2010/0306753 | A1 * | 12/2010 | Yi et al. | 717/149 |

OTHER PUBLICATIONS

Xiaotong Zhuang; Eichenberger, A.E.; Yangchun Luo; O'Brien, K.; , "Exploiting Parallelism with Dependence-Aware Scheduling," Parallel Architectures and Compilation Techniques, 2009. PACT '09. 18th International Conference on , vol., no., pp. 193-202, Sep. 12-16, 2009doi: 10.1109/PACT.2009.10 URL: http://ieeexplore.ieee.org/stamp/stamp.jsp?tp=&arnum.*

(Continued)

*Primary Examiner* — Wei Zhen
*Assistant Examiner* — Matthew Brophy
(74) *Attorney, Agent, or Firm* — Scully, Scott, Murphy & Presser, P.C.; William Stock, Esq.

(57) ABSTRACT

An optimizing compiler device, a method, a computer program product which are capable of performing parallelization of irregular reductions. The method for performing parallelization of irregular reductions includes receiving, at a compiler, a program and selecting, at compile time, at least one unit of work (UW) from the program, each UW configured to operate on at least one reduction operation, where at least one reduction operation in the UW operates on a reduction variable whose address is determinable when running the program at a run-time. At run time, for each successive current UW, a list of reduction operations accessed by that unit of work is recorded. Further, it is determined at run time whether reduction operations accessed by a current UW conflict with any reduction operations recorded as having been accessed by prior selected units of work, and assigning the unit of work as a conflict free unit of work (CFUW) when no conflicts are found. Finally, there is scheduled, for parallel run-time operation, at least two or more processing threads to process a respective the at least two or more assigned CFUWs.

25 Claims, 8 Drawing Sheets

OTHER PUBLICATIONS

E. Gutierrez, O. Plata, and E. L. Zapata. 2000. A compiler method for the parallel execution of irregular reductions in scalable shared memory multiprocessors. In Proceedings of the 14th international conference on Supercomputing (ICS '00). ACM, New York, NY, USA, 78-87. DOI=10.1145/335231.335239 http://doi.acm.org/10.1145/335231.335239.*

Rauchwerger, L.; Padua, D.A.; , "The LRPD test: speculative run-time parallelization of loops with privatization and reduction parallelization," Parallel and Distributed Systems, IEEE Transactions on , vol. 10, No. 2, pp. 160-180, Feb. 1999 doi: 10.1109/71.752782 URL: http://ieeexplore.ieee.org/stamp/stamp.jsp?tp=&arnumber=752782&isnumber=16259.*

Rai, A.; Lopez-Benitez, N.; Hargis, J.D.; Poduslo, S.E.; , "Heterogeneous parallelization of the Linkmap program," Parallel Processing, 2000. Proceedings. 2000 International Workshops on , vol., no., pp. 353-360, 2000 doi:10.1109/ICPPW.2000.869139.*

Arenaz et al., "An Inspector-Executor Algorithm for Irregular Assignment Parallelization", ISPA 2004, LNCS 3358, 2004, pp. 4-15, Springer-Verlag Berlin Heidelberg.

Arenaz et al., "Irregular Assignment Computations on cc-NUMA Multiprocessors", ISHPC 2002, LNCS 2327, 2002, pp. 361-369, Springer-Verlag Berlin Heidelberg.

Gutiérrez et al., "Improving Parallel Irregular Reductions Using Partial Array Expansion", SC2001, ACM 1-58113-293-X/01/011, Nov. 2001, pp. 1-7, ACM, Denver, Colorado, USA.

Gutiérrez et al., "On Improving the Performance of Data Partitioning Oriented Parallel Irregular Reductions", Proceedings of the 10th Euromicro Workshop on Parallel, Distributed and Network-based Processing (EUROMICRO-PDP'02), 2002, IEEE Computer Society.

Gutiérrez et al., "Scalable Automatic Parallelization of Irregular Reductions on Shared Memory Multiprocessors", 8th Workshop on Compilers for Parallel Computers (CPC'2000), Jan. 4-7, 2000, Aussois, France.

Han et al., "Efficient compiler and run-time support for parallel irregular reductions", Parallel Computing 26, 2000, pp. 1861-1887.

Huang et al., "An Efficient Run-Time Scheme for Exploiting Parallelism on Multiprocessor Systems", HiPC 2000, LNCS 1970, 2000, pp. 27-36, Springer-Verlag Berlin Heidelberg.

Huang et al., "A practical run-time technique for exploiting loop-level parallelism", The Journal of Systems and Software 54, 2000, pp. 259-271.

Rauchwerger, "Run-Time Parallelization: It's Time Has Come", pp. 1-24.

* cited by examiner

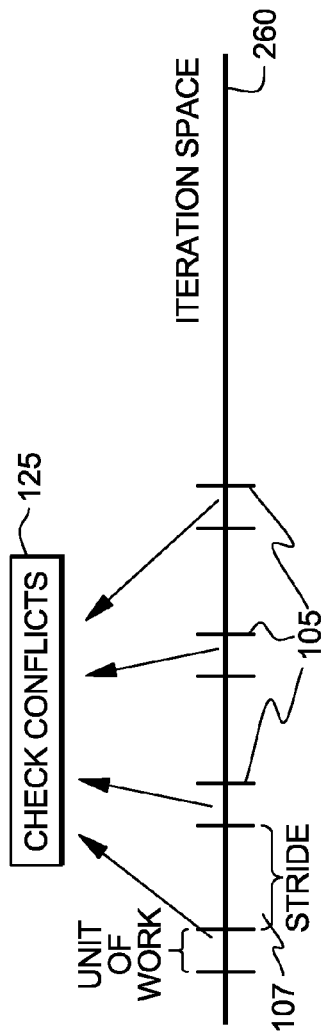

FIG. 6

```
FOR (time=0; time<10 SEC; time+=1 SEC) {
  //EVERY SECOND RECOMPUTE THE b[i]s
  COMPUTE b[i]
  FOR(t=0; t<1 SEC; t +=1 milli SECOND) {
    FOR(i=0; i<10**6; i++) {
      //COMPUTATION FOR PARTICULULE i
      a[b[i]] +=xxx
    }
  }
}
```
275

270

```
FOR (time=0; time<10 SEC; time+=1 SEC) {
  // EVERY SECOND RECOMPUTE THE b[i]s
  COMPUTE b[i]
  S2 START LIST BUILDER THREADS TO COMPUTE
  CFUW; STORING THE CFUW IN MEMORY
  FOR(t=0; t<1SEC; t +=1 milli SECOND) {
    S3: RETRIEVE CFUW FROM MEMORY
    START WORKING THREADS THAT CONSUME CFUW
  }
}
```
285

PARALLELIZATION OF IRREGULAR REDUCTIONS VIA PARALLEL BUILDING AND EXPLOITATION OF CONFLICT-FREE UNITS OF WORK AT RUNTIME

BACKGROUND

Parallelizing code with reductions is extremely important for achieving high performance for a wide range of important numerical applications, especially codes simulating atomic interactions.

The parallelization of a scalar reduction is well understood. Consider, for example "for i=0 . . . n do r+=xxx" where "xxx" is a number computed by an expression that does not use the "r" value. The i=0 . . . n do r+=xxx notation represents iterative operation r=a[0]+a[1]+a[2]+a[3]+a[4]+a[n−1] which can also be written as r=0; for (i=0; i<n; i++) r+=a[i] or as r=0; for (i=0; i<n; i++) r=r+a[i]. The "r" value is also referred to herein as the reduction variable, in that it is a variable (i.e., a name for a value) which is the target for the reduction of the sum of the a[i]'s value, in the above example.

Such loop is easily parallelized by computing partial reduction, one reduction variable per SIMD width/parallel thread. The final value is assembled at the end by performing a sequential reduction on each of the partial reduction. Another well understood pattern is that of regular array reduction. Consider for example "for i=0 . . . n do a[i]+=xxx" which represents iterative operations a[i]=a[i]+xxx. In such case, a distinct interval of the "i" loop may be applied to distinct threads and computed in parallel. In this case, the "a[i]" is referred as the reduction variable.

The more challenging pattern is that of irregular array reduction that is frequent in numerical code. Consider for example "for i=0 . . . n do a[b[i]]+=xxx." In this case, the for loop cannot be directly parallelized as b[i] and b[i'] may be pointing to the same element, where i and i' are two instances of the iteration variable i, for example i=5 and i'=7. Unfortunately, this pattern is frequent in many numerical applications. In the above case, 'a[ ]' is also referred to as a reduction variable, as the xxx values are being reduced into it. However, unlike in the previous case, we now can identify the actual instance of a[ ] that is being reduced only at runtime, as we typically do not know the values of the b[i] until runtime. We also refer to this reduction variable as a reduction variable whose address can only be determinable at run-time. There are other patterns that have the same irregular characteristics, for examples "for i=0 . . . n do *a[i]+=xxx" where a[i=0 . . . n] is an array of pointers, and where the value pointed to by each pointer location a[i=0 . . . n] is incremented by the xxx expression. Note also that while loops with only a single statement have been described, in real applications, there are typically several statements, including conditional statements. Thus, while the same principle applies to more complicated loops, for purposes of discussion, examples described herein are focused on such simpler single statement loop.

To address this, one approach is to privatize the entire "a" array, keeping one private copy per thread, and then assigning a distinct interval of the "i" loop to each thread. In addition to this significant increase in memory footprint (increase proportional to the size of the reduction array and the number of concurrent threads), a final reduction must then be performed on all private threads to generate the final "a[ ]" values.

Another approach uses software/hardware support to parallelize the computations assuming that no conflict will occur, e.g. that no two processors will attempt to concurrently update the same a[i] at the same time. For such scheme, Transactional Memory is ideal, as the software/hardware implementation will undo computation in the occurrence of conflicts. While the hardware approach is in principle faster, it requires significant hardware modifications to the architecture that may/may not be present on the target machine. The software approach is generally too slow to be a competitive solution for such patterns. Furthermore, both approach rely on the assumptions that conflict are infrequent, which is very program/input dependent.

It would be highly desirable to provide a system and method for solving the parallelization of irregular reductions that does not require any custom hardware (except parallel threads/cores) and exhibit good parallel speed while keeping the memory footprint of the original application.

BRIEF SUMMARY

There is provided a system and method for solving the parallelization of irregular reductions that does not require any custom hardware (except parallel threads/cores) and exhibit good parallel speedups while keeping the memory footprint of the original application.

More particularly, there is provided a system and method for identifying—through compiler analysis and run-ahead operation—work threads in computations which are order-independent, and dispatching them for concurrent operation in a multithreaded environment.

In one aspect, there is provided a method in a computer system for performing parallelization of irregular reductions. The method comprises: receiving, at a compiler device, a program; selecting, at compile time, at least one unit of work (UW) from the program, each UW configured to operate on at least one reduction operation, where at least one reduction operation in the UW operates on a reduction variable whose address can only be determinable when running the program at a run-time; recording, at run time, for each current at least one UW, a list of reduction operations accessed by that current unit of work; and, determining, at run time, whether reduction operations accessed by a current UW conflict with any reduction operations recorded as having been accessed by prior selected units of work, and assigning the unit of work as a conflict free unit of work (CFUW) when no conflicts are found; and, scheduling, for parallel run-time operation, at least two or more processing threads to process a respective the at least two or more assigned CFUWs.

In a further aspect, the conflict determining comprises:
a) retrieving a first unprocessed unit of work (UW 1) at run time;
b) generating a list of reductions touched by the UW 1;
c) storing the list of reductions accessed by the UW 1 in a set;
d) selecting a second unprocessed unit of work (UW 2); and,
e) determining whether any reduction operations are touched by the UW 2;
f) testing whether any determined reduction value accessed by the UW 2 is already included in the set; and,
g) if the determined reduction accessed by the UW 2 is not included in the set, adding each reduction touched by the UW 2 into set; and
h) assigning said UW 1 and UW 2 to a common queue of conflict free units of work for processing at run time.

According to another embodiment of the present invention, there is provided a system for optimizing a program. The system comprises: a memory; a processor coupled to said memory, said processor running program instructions for performing parallelization of irregular reductions, said method comprising: receiving an input program; selecting, at compile time, at least one unit of work (UW) from said program, each UW configured to operate on at least one reduction operation, where at least one reduction operation in the UW operates on a reduction variable whose address is only determinable when running said program at a run-time, for each successive current UW, a list of reduction operations accessed by that unit of work; and, determining, at run time, whether reduction operations accessed by a current UW conflict with any reduction operations recorded as having been accessed by prior selected units of work, and assigning said unit of work as a conflict free unit of work (CFUW) when no conflicts are found; and, scheduling, for parallel run-time operation, at least two or more processing threads to process a respective said at least two or more assigned CFUWs.

In still a further aspect, there is provided a computer program product for performing parallelization of irregular reductions. The computer program product comprises: a storage medium readable by a processing circuit and storing instructions for operation by the processing circuit for performing a method comprising: receiving an input program; selecting, at compile time, at least one unit of work (UW) from said program, each UW configured to operate on at least one reduction operation, where at least one reduction operation in the UW operates on a reduction variable whose address is only determinable when running said program at a run-time; recording, at run time, for each successive current UW, a list of reduction operations accessed by that unit of work; and, determining, at run time, whether reduction operations accessed by a current UW conflict with any reduction operations recorded as having been accessed by prior selected units of work, and assigning said unit of work as a conflict free unit of work (CFUW) when no conflicts are found; and, scheduling, for parallel run-time operation, at least two or more processing threads to process a respective said at least two or more assigned CFUWs.

BRIEF DESCRIPTION OF THE SEVERAL VIEWS OF THE DRAWINGS

The objects, features and advantages of the present invention will become apparent to one ordinary skill in the art, in view of the following detailed description taken in combination with the attached drawings, in which;

FIG. 6 shows in one embodiment how the list-builder selection of non-contiguous UWs as candidates for the CFUW according to one embodiment;

FIG. 7 shows a pseudocode depiction of an example program code sequence simulating an application wherein a detected pattern indicating a reduction operation is fixed between two consecutive iterations and resulting code enhancement for storing in memory any determined CFUW for said iterations;

DETAILED DESCRIPTION

Optimizing compilers optimize the code of a computer program by rearranging the code sequences to take maximum advantage of the computer architecture and the specific configuration of the individual computer program.

Optimizing compilers permit efficient object code to be emitted given a particular piece of source code to be compiled. Source code that includes loops is typically the subject of optimization in compilers. For a given segment of source code containing loops and for a given target machine micro architecture, cache geometry and parallel processing capability, the loop allocation of an optimizing compiler is used to attempt to determine a collection of object code loop nests which will give efficient performance at an acceptable compilation-time cost.

Thus, an aspect of the present invention is to provide an optimizing compiler device, a compiling method, a compiler program and a recording medium, which are capable of performing parallelization of irregular reductions that does not require any custom hardware (except parallel threads/cores) and exhibit good parallel speedups while keeping the memory footprint of the original application.

Figure 1:
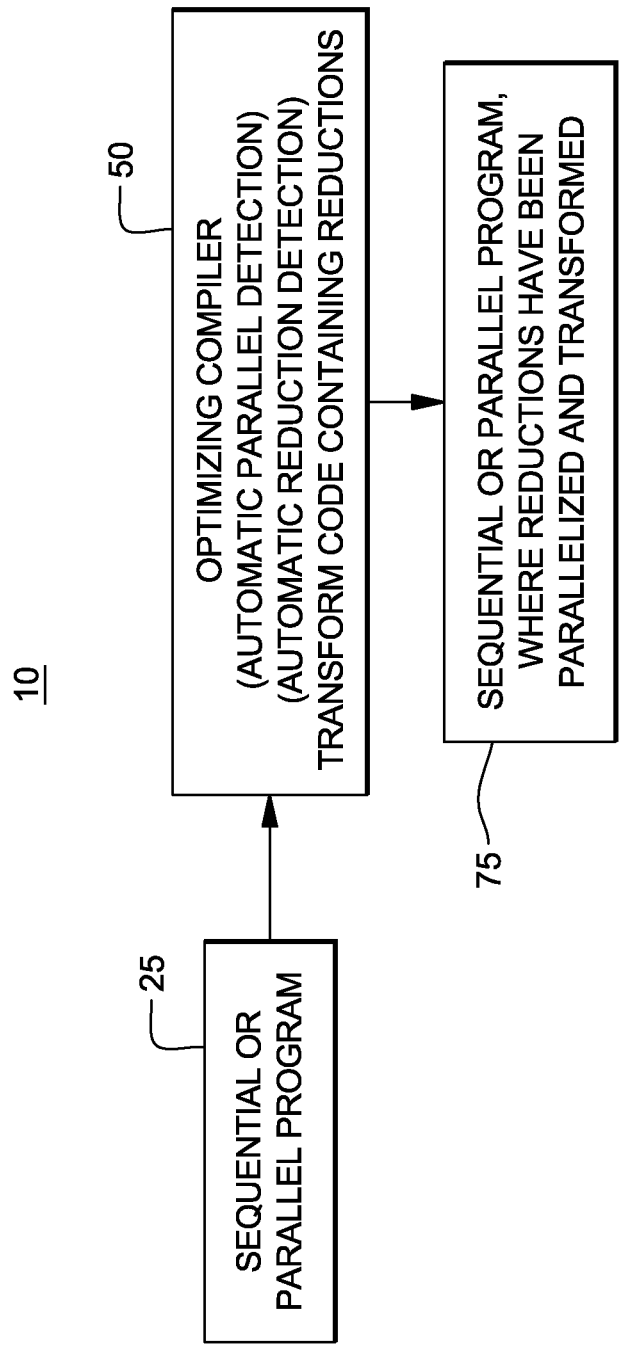
FIG. 1 illustrates a schematic of a system implementing the optimizing compiler optimized for improving performance of irregular array reductions according to one embodiment of the invention.

FIG. 1 illustrates a computing system 10 including an optimizing compiler providing run-time functionality for performing parallelization of irregular array reduction according to the invention. As shown in FIG. 1, a sequential or parallel program 25 (e.g., a C, C++, Fortran, or other high-level language, etc.) frequently found in parallel scientific applications, among others, that is configured for running parallel threads is input for compilation by an optimizing compiler device 50. The optimizing compiler 50 is configured for automatic parallel detection and, automatic reduction detection, e.g., (detecting A[k]=A[k]+xxx, or like reduction pattern). Then if the compiler detects the nature of the input code as performing parallelization of irregular reductions, the code is transformed to include the reduction in accordance with the present invention. The output 75 of the optimizing compiler device 50 provides a sequential or parallel program in which reductions have been transformed according to the principles of the invention. The process may be considered "source to source", where the program output may be a modified version of the program input (e.g., C program), or, the output may be transformed into a binary. It is understood that the optimizing compiler may also perform other optimizations that are outside of the scope of the present invention described herein.

Particularly, in one embodiment of the invention, the optimizing compiler device 50, compiling method, and compiler program performs identifying-through compiler analysis and run-ahead operation-work threads in computations which are order-independent, and dispatching them for concurrent operation in a multithreaded environment or any like environment implementing shared memory parallelism. One specific case illustrated for exemplary purposes is the implementing of reduction operations.

Figure 2:
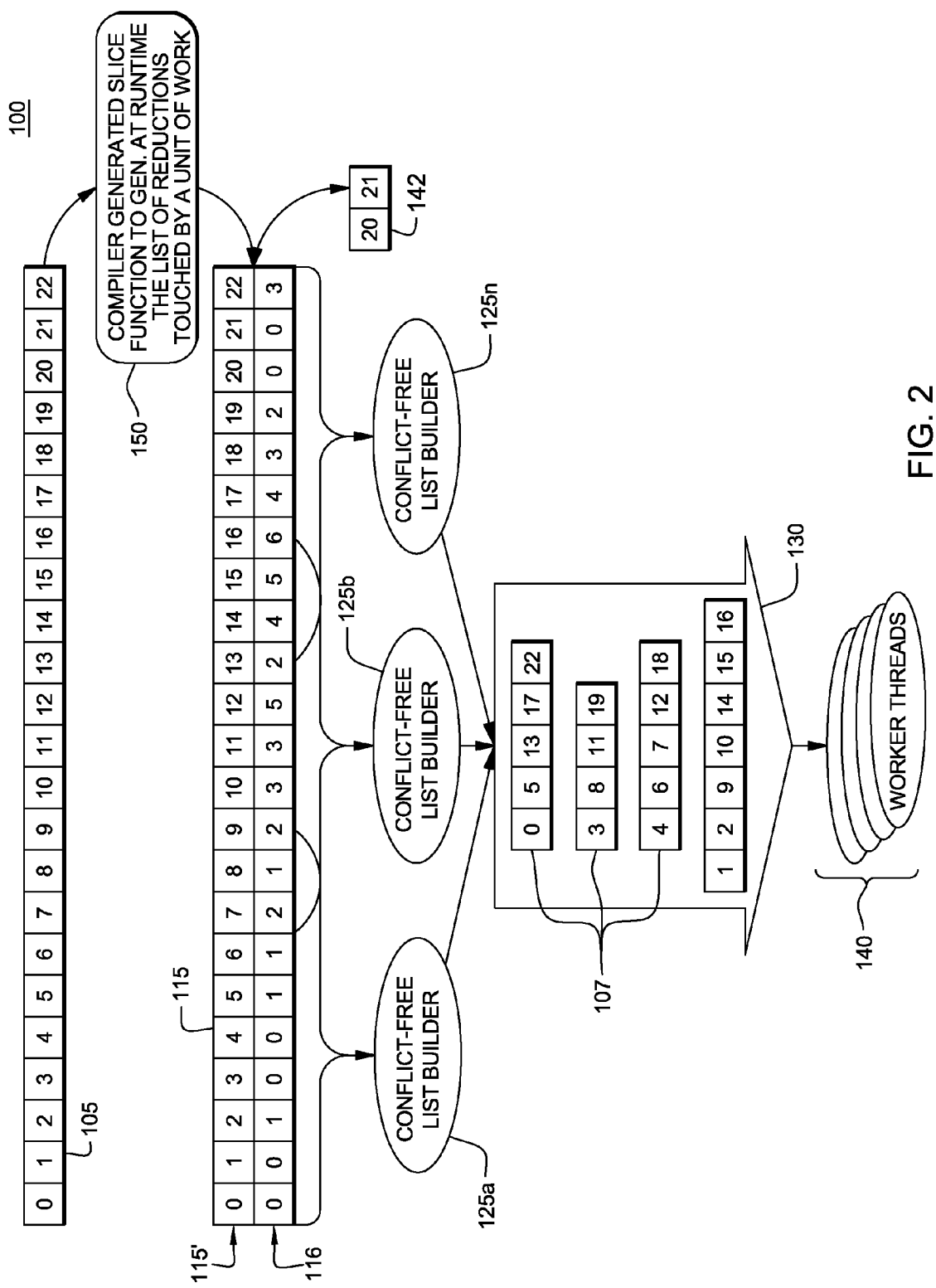
FIG. 2 illustrates a schematic diagram of a system 100 including the optimizing compiler of FIG. 1 for improving performance of irregular array reductions according to one embodiment.

FIG. 2 depicts the compiling program and methodology 100 for performing irregular reductions according to the invention. The method includes identifying—through compiler analysis and run-ahead operation—work threads in computations that are order-independent, and dispatching them for concurrent operation in a multithreaded environment. Particularly, one or more dedicated run-ahead threads are initiated at run-time to detect units of work that are free of conflict, e.g., any value that can be added that does not conflict, and build a list of conflict free units of work, i.e., two or more units of work that do not try to add the same value twice. Conflict-free units of work (CFUW) are communicated to a pool of worker threads in parallel whereby each worker thread, operating in parallel, picks one or more unit of work within a given CFUW and runs it without synchronization. These steps of orchestrating one or more dedicated run-ahead units to detect conflict-free units of work, sending detected conflict-free units of work to a pool of workers and running the units of work within conflict-free units of work without synchronization are iterated. In one embodiment, the iterations do not terminate until the remaining units of work drop below a given threshold. Additionally, the remaining units of work may be computed sequentially. In this embodiment, no extra hardware is needed, nor is there any requirement of guessing of conflicts. This results in the achievement of higher processing speeds.

As shown in FIG. 2, there is depicted a method for building conflict free units of work such as units of work 105 shown labeled as UW 00, 01, . . . , 22. The method includes the invoking of optimizing compiler to generate a slice function 150 which finds and generates—at runtime—a list of reductions touched by a unit of work (e.g., which values of a[b(i)] are touched or incremented). As referred to herein, a Unit of Work 105 may comprise one original loop iteration, e.g., one loop iteration of a "do-while" or "for" loop, etc. Thus, in one illustrative example, one iteration is one unit of work, e.g., loop is for (i=0; i<23; i++) a[b[i]+=xxx. Thus, an exemplary compiler slice function may take the form of, for example: slice (iteration i)=b[i] and functions to find from the original program target values being updated by units of work, e.g., which a[b[i]] is being updated or added by a specific unit of work. Additional examples of a Unit of Work in the context of the present invention include, but are not limited to: a subset of an original loop iteration (e.g., where a loop can be divided into two pieces, where two reductions are present); or a block of the iteration space by a pre-defined blocking size (e.g., a loop that has 1 million operations that can be reduced into chunks such that one hundred iterations comprises a unit of work). The unit of work comprising a block of the iteration space of a pre-defined blocking size can be defined with a stride. In one embodiment, a Unit of Work may comprise an arbitrary set of loop iterations. The list of reductions touched by a unit of work 115 and repeated as 115' is shown as list 116. In the method depicted in FIG. 2, list 116 shows the b[i] values for each UW (iteration "i") in list 115', i.e., corresponding to iterations i=0, . . . , 22. In one embodiment, the system may impose a constraint that comprises defining each iteration (or subset thereof) be in at least one unit of work, and that no iteration (or subset thereof) be in two or more distinct units of work.

Continuing, one or more run-ahead threads are instantiated that function to build CFUW. FIG. 2 depicts run-ahead threads 125a, . . . 125n that detect conflict free units of work. The run-ahead threads generate a list or queue 130 having groups or rows 107 of the detected conflict free units of work that are known to have no conflicts and that can run in parallel. In the example embodiment shown in FIG. 2, a list or queue 130 is depicted showing all of the detected CFUW where none of the rows (i.e., one CFUW) has b[i] with equivalent values, since to be in a CFUW, each UW (namely iteration i) must touch a distinct location in the array "a", namely address a distinct a[b[i]]. For example, the example queue 130 indicating list of reductions 116 not touched (conflict free unit of work), e.g., iterations 0, 5, 13, 17, and 22 belong to a single conflict free unit of work because their respective iterations access distinct locations of array a, since their respective accesses a[b(0)], a[b(5)], a[b(13)], a[b(17)], and a[b(22)] result in effective accesses of the following locations of array a[ ], namely a[0], a[1], a[2], a[4], and a[3] since b(0), b(5), b(13), b(17), and b(22) evaluate, respectively, to 0, 1, 2, 4, and 3. The same property holds for the next CFUW 107 in the queue 130, namely the next CFUW containing the units of work 3, 8, 11, and 19 update distinct array locations of array a[ ]. The same holds also for the CFUW containing the units of work 4, 6, 7, 12, and 18. The same holds as well for the CFUW containing the units of work 1, 2, 9, 10, 14, 15, and 16. Note also that units in distinct CFUW may or may not update distinct array location.

Continuing, there is next performed the steps of communicating the CFUW in list or queue 130 to a pool of worker threads 140 that compute, in parallel, the CFUW. Thus, in the embodiment depicted, workers can pick an arbitrary UW within the list or queue 130 of CFUW. In an example embodiment, after picking an arbitrary UW from within the list or queue 130, the process waits for all UW to be finished within the CFUW queue before moving on to the next CFUW.

As further shown in FIG. 2, it is understood that the worker threads pick remaining units of work when a number of remaining units of work is below a predetermined threshold. Thus, in the example method, there are two work units 142 (UW 20 and 21) that are not queued on the list 130 which indicate that the last two iterations are too few to be done by the worker. In such a case, a single thread may run them sequentially. In another example embodiment, the predetermined threshold is zero, meaning that all units of work will be assigned to CFUW. In such case, there is no need to have a single thread looking for remaining units of work to be run sequentially.

As mentioned, and further to the illustration of the method of FIG. 2, the run-ahead threads 125a, . . . 125n (list builder threads) run reduction slices from the loop body (generated by the compiler). Only the instructions that involve reductions are included in the slice. A result of an exemplary reduction slice function that identifies accesses to the same element includes the following: inputting a loop iteration index i that is to be investigated; and, outputting a set of reductions (e.g. set of array elements) touched by iteration i.

Figure 3:
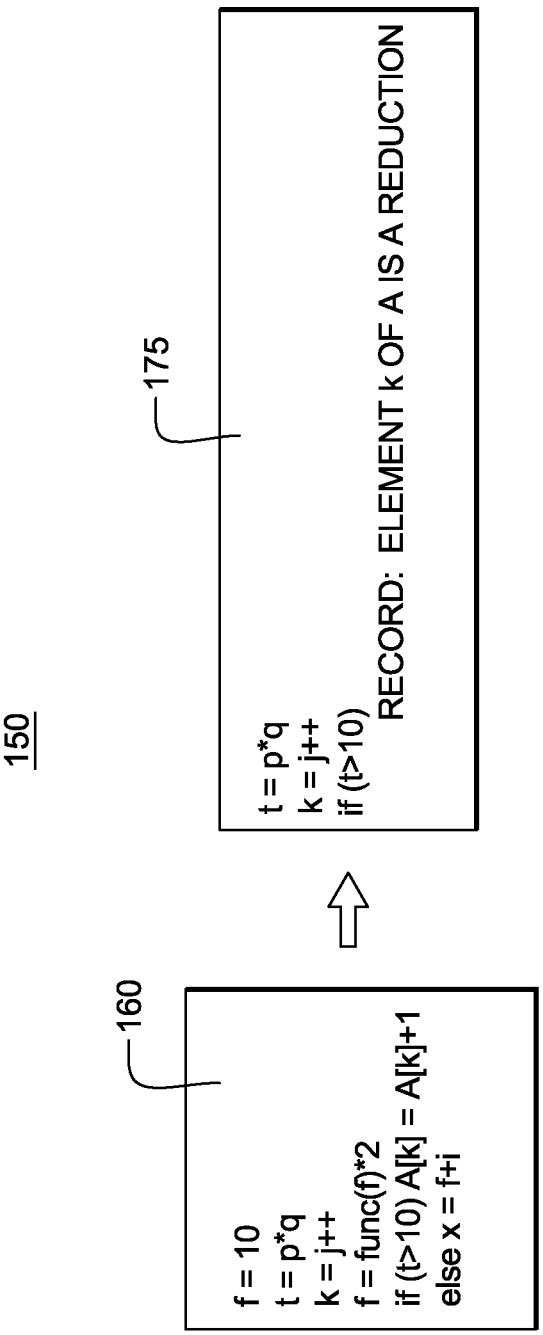
FIG. 3 illustrates results of applying an example reduction slice function 150 invoked by optimizing compiler for an iteration i of an iterative loop of an input program.

FIG. 3 depicts an illustration of an example reduction slice function 150 invoked by optimizing compiler that detects input program code 160 configured to have a loop body or iterations within which reductions operations are to be performed. FIG. 3 particularly illustrates a corresponding compiler (reduction slice) generated code 175 corresponding to input code 60 for code iteration i. In the slice function, there is first identified the presence of a reduction operation in the input code, e.g., a[i]=a[i]+1. In the reduction slice, all process code that is needed that leads to the computation of the reduction operation must be kept (e.g., the computation of variables i (the value of the array that is being incremented to know when the reduction occurs and what is being reduced) and "t" (the variable guarding the reduction). For example, in the code segment depicted in FIG. 3, variable "t" has to be greater than a value of "10" to determine whether reduction occurs or not. In order to know this, at run-time, the slicing function 150 needs to include all computations leading to the "t" value (e.g., t=p*q in the example code shown). Additionally, the slicing function must compute the value of "k" (=j++) which has to be known in order to determine the value of "i" (the array location of a[ ] that gets incremented). Note that the computation of variable "f" shown in the input code 160 of FIG. 3 is not necessary in the slice function as this value is not required in determining whether the unit of work touched a reduction.

Figure 4:
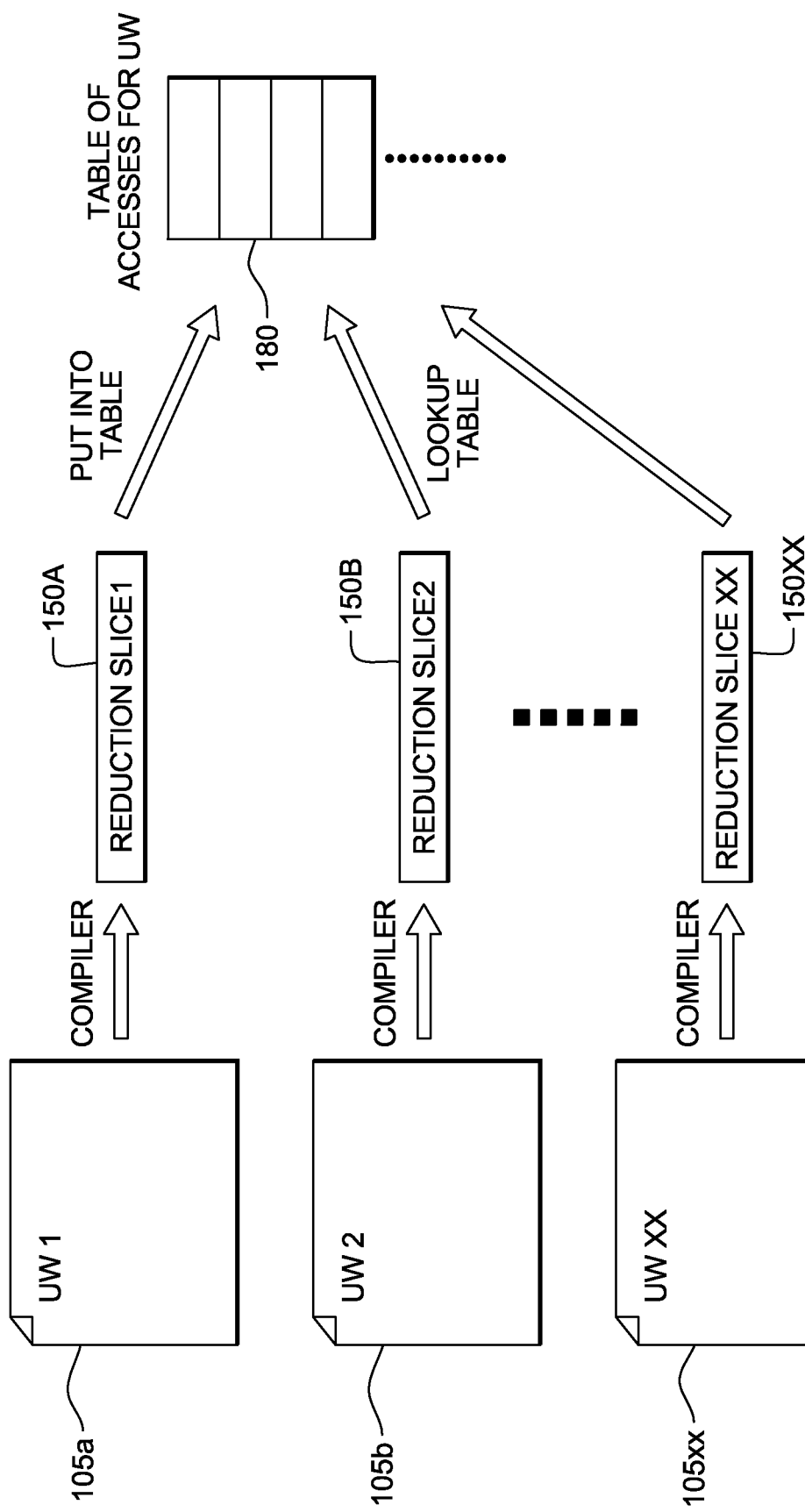
FIG. 4 illustrates the determination, by a conflict list builder (run-ahead thread) of conflicts between two units of work (UW) and whether two (or more) UWs can both be entered in the same conflict free list or not.

The determination, by the conflict list builder (run-ahead thread), of conflicts between two units of work (UW) and whether two (or more) UWs can both be entered in the same conflict free list or not, is depicted in reference to FIG. 4. For exemplary purposes, an example array a[b(i)] is assumed where iteration index "i" is on the order of a million (a million iterations), with a first unit of work (UW 1) corresponding to the first 100 iterations (e.g., i=0, . . . , 99) and the second unit of work (UW 2) is the second 100 iterations (e.g., i=100, . . . , 199), etc. Generally, in the example shown in FIG. 4, the compiler runs a first reduction slice 150a for a first unit of work 105a (UW 1) and accesses are stored into a table 180. Thus, the first reduction slice 150a, computes in this example all of the b(i) that are touched by the unit of work in iterations 1-100. The results of the first reduction slice are entered into a set, e.g., for storage in an attached or remotely connected memory storage device. In one embodiment, the results of the first reduction slice are provided in a memory or database configured as a hash table 180. Then, the reduction slice 150b for a second unit of work 105b (UW 2) is invoked to determine array locations a[ ] (particularly, what b(i) values in this iteration group) that are touched by reduction. Continuing, a check is performed by processing (e.g., by scanning or look-up) the hash table for any conflicts between the array locations stored in hash table corresponding to UW 1 and, for example, any array locations a[ ] determined by reduction slice results for the second unit of work 105b (UW 2). This concept is easily extended to two or more groups of UWs with the hash table functioning to aggregate all array locations a[ ] that have been accessed by each UW (UW1, . . . , UWxx). Thus, in the second iteration, code of the slice function 150b is implemented to determine whether array locations a[ ] determined by reduction slice results for the second unit of work 105b (UW 2) conflicts with (i.e., have any elements in common with) the results found in the hash table from the prior iteration (UW1). If conflicting elements are found, then this element (array location a[ ] for that location b(i) can not be added to the CFUW (conflict free list)). If no conflicting elements are found, then each of the accesses performed by that non-conflicting unit of work, and the unit of work is added to the CFUW. In an exemplary embodiment, non-conflicting units of work are always added to the CFUW. In another exemplary embodiment, other criteria are used to determine if it is beneficial to add the current non-conflicting unit of work in the present CFUW, using criteria such as data locality, cache performance metrics, and other performance metrics relevant to the given target machine.

Figure 5:
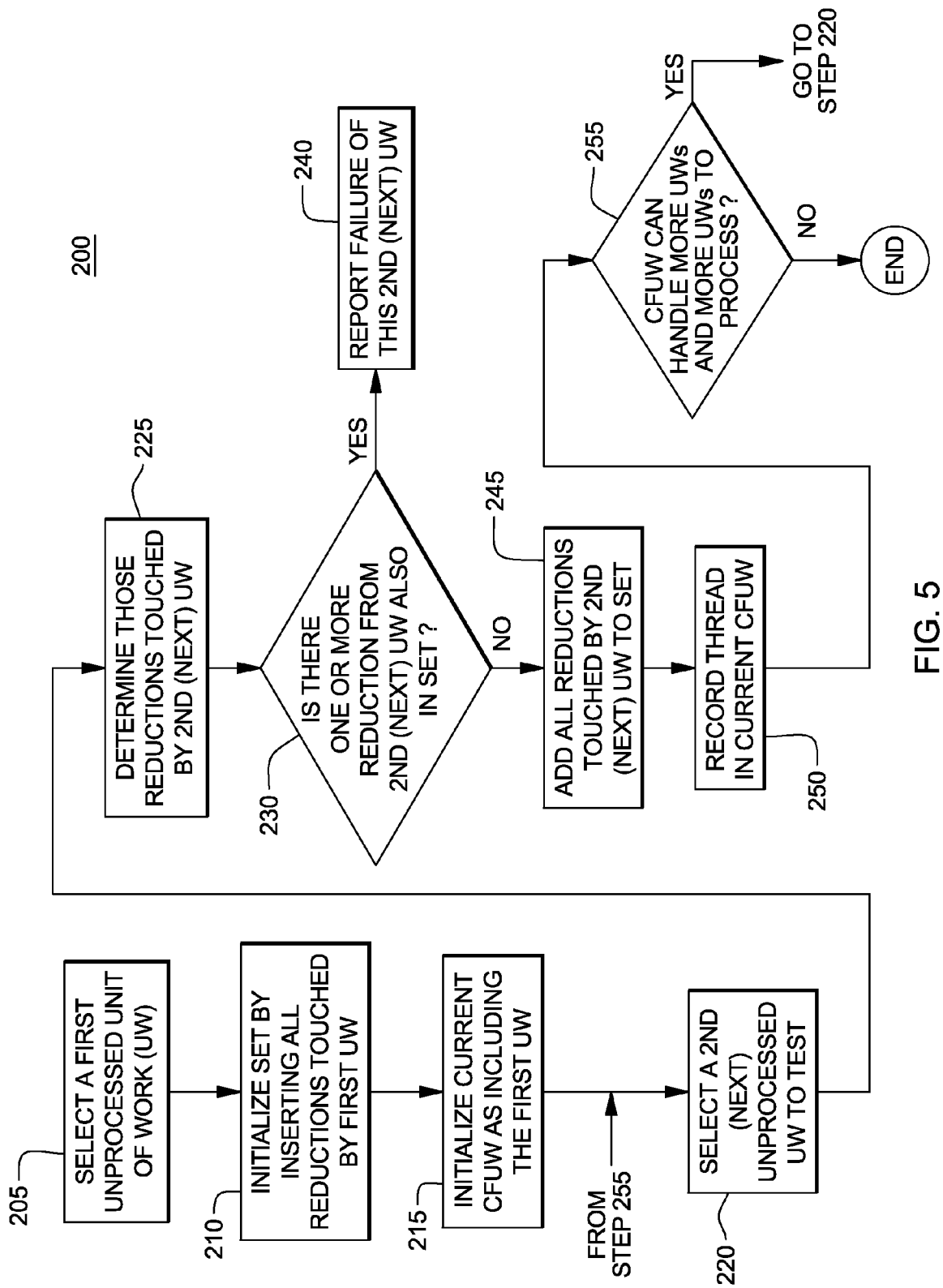
FIG. 5 illustrates a flow charts describing method steps employed by the system for improving performance of irregular array reductions according to one embodiment.

FIG. 5 illustrates a flow chart of the exemplary methodology 200 as processed by the run-ahead threads of the optimizing compiler that determine conflict-free units of work. As shown, a first step 205 includes selecting a first unprocessed Unit of Work (e.g., UW 1 of FIG. 4) such as implemented by running compiler reduction slice 1 that includes a first set of iterations. Then, at step 210, there is computed all of the reductions that are touched by the unit of work UW 1, and the initialization of a set that include all reductions touched by first the UW 1 that are entered into the set. In one embodiment, the set may be implemented as a hash table. When implementing a hash table (set), an element may be added to the hash set practically in linear time and an element in a hash set can be checked also practically in linear time (e.g., see http://en.wikipedia.org/wiki/Hash_table). In another embodiment, a set of the reductions touched by a UW may comprise a linked list (where elements added to the set are added to the list and elements must be searched in the list to find whether it exists in the set by (or reach the end of the list without finding it)). In a further embodiment, a set of the reductions touched by a UW may comprise a bit vector, such that if the range of elements in the set (e.g. elements 0 to 1 million) are known, then one bit is assigned for each element and, for elements in the set, their corresponding bit is set to 1, and if any element is not in the set, the bit is set to 0, for example. Note that all data structures such as hash table or any other means used to compute and record accesses performed by the units of work are associated to each conflict-free list builder thread. In other words, distinct builder threads work fully in parallel, as they do not share data structures. Then, at 215 the current Conflict Free Unit of Work (CFUW) is initialized as containing this first UW 1. At, 220, a second unprocessed UW (e.g., UW 2 of FIG. 4) is selected for testing. Then, a loop at 225 is entered comprising determining, by applying a second reduction slice, all those reduction operations touched by that ($2^{nd}$ or subsequent) unit of work. Then, at 230, it is determined for each reduction touched by the second UW 2 (or subsequent UW), whether one or more reduction operation(s) is (are) already in the set (e.g., hash table) at 235. If determined that the reduction is already entered in the set, a failure is reported for this UW 2 at 240. If no failure is reported (e.g., the reduction had not been entered into the hash table), then each reduction touched by second UW is added into the set at 245. This thread is then recorded as being part of the current CFUW at 250.

Of all original iterations, no units of work are omitted. Thus, the loop processing continues to determine at 255 whether there are enough UWs in this set of CFUW, and whether there are any unprocessed UWs. If it is determined at 255 that the CFUW can handle more UWs and there are additional UWs to process, then the process returns to step 220 where the "next" unprocessed unit of work is selected. The iteration at 225 to 255 is then performed for determining the reductions touched by the next UW selected. Otherwise, the process ends.

It is understood that, at compile time, the optimizing compiler first implements functions that provide for the recognition of the patterns (e.g., a reduction operation a[b(i))]) and the optimization is activated for the type of pattern. That is, the compiler instrument the code for building the conflict free UW list according to the list-building method as shown and described with respect to FIG. 5 where it is uncertain at compile time what is being reduced (e.g., the b(i) values which are not available at compile time are computed at run-time). Thus, while it is not additionally known which UW is included, the compiled code is orchestrated to build the CFUW list of elements (to be operated on in parallel) not known at compile time.

Referring back to FIG. 2, by running reduction slices, conflict-free builder thread finds a plurality of units of work that are free of conflicts. A CFUW(s) is(are) assigned to a queue(s) to be picked by worker threads with whom they communicate via a standard queue messaging format. In one embodiment, the queue may be implemented as a linked list of CFUW that are ready for processing. In addition to a linked list, the queue may also be associated with a lock that is used to guarantee that at most one thread is reading or writing the linked list implementing the queue. When a new conflict-free builder thread has completed the detection of a new CFUW, then this thread will grab a lock that protects the queue. Once the lock is acquired, this means that this thread is the only one allowed to read or write the data structures of the queue. In case another thread (be it a worker thread or another conflict-free builder thread) tries to grab the lock, that other thread will have to wait for the first thread to release the lock. Only then will one other thread be able to grab the lock and further read and/or modify the data structures of the queue. In any case, once a conflict-free builder thread has detected one or more new CFUWs and has gabbed the lock associated with the queue, this thread will add the one or more CFUWs to the list of ready CFUWs. Once the thread has finished reading and writing the list, the thread will release the lock so as to allow other threads to also read or modify the queue. In a similar fashion, when all the worker threads have completed working on their current CFUW, one of the worker threads will acquire the lock, and then select one of the ready CFUWs on the list for processing. The selected CFUW is then removed from the list, and the lock is released. In one exemplary embodiment, the oldest CFUW on the list is the one that will be selected by the workers. In another exemplary embodiment, an arbitrary CFUW is the one that will be selected by the workers. In yet another exemplary embodiment, the CFUW that is selected is one that maximizes some performance metrics, such as maximum memory locality with previously completed CFUWs. Other performance metrics can be used as well for the selection of a suitable CFUW. The Conflict-free builder threads continue finding the next set CFUW. FIG. 6 shows in one embodiment how, along iteration space 260, it may be advantageous to select non-contiguous UWs as candidates for the CFUW. For example, UWs 105 may be selected periodically, e.g., according to a step stride 107. This creates efficiencies as the potential for determining conflicts among two consecutive threads is reduced. It is understood that, in alternate embodiments, an arbitrary or random (static/dynamic) ordering for selecting UWs can be implemented. By partitioning the original iteration space into distinct set of iterations, there can be multiple Conflict-Free list builder threads analyzing a distinct set of the original iterations working in parallel, which may tend to decrease likelihood of finding conflicts and increase efficiency.

Further efficiencies may be built into the optimizing compiler and CFUW list builder code. For instance, in an application including modeling of particle interactions (e.g., particle dynamics), where experiments track how particles react over time (e.g., an iterative computation every fraction of a microsecond), may require time stamped computations. Thus, in such instance, computing the particle reactions that involve reductions may be a frequency, e.g., once every microsecond, millisecond or once every second, for example. It is possible that, in such simulations, a detected pattern may not change. For example, as shown in FIG. 7 illustrating an example program code sequence 270 simulating particle interactions, a program code portion 275 depicts how the b[i] in a[b[i]]+=is fixed between two consecutive time "t" iterations. In this case, all conflict free units of work are still valid from the prior iteration to the next, and they do not have to be recomputed at each step. Thus, in this situation, an approach wherein a CFUW is rebuilt each time by starting list builder threads that compute CFUW and starting working threads that consume CFUW is avoided. Rather, in an alternate embodiment, such as shown in FIG. 7, the CFUW is built once as reflected by example code portion 280 where the start list builder threads compute CFUW and the CFUW are stored in memory and reused multiple times which is reflected in the example program code sequence 285 showing a for loop (e.g., "for (t=0; t<1 sec; t+=1 millisecond)") and functionality that retrieves a stored CFUW from memory before starting the working threads that consume (nm) the CFUWs. Thus, in this embodiment, the CFUW can be stored from one major iteration to the next, so as to not require re-computing the CFUW at each major iteration. Then, the list builder thread need only be invoked when the pattern has changed.

Similarly, when selecting which UW to add into a CFUW, the list builder thread can take into considerations data locality or other performance criteria as long as no two units of work in a CFUW access a common reduction variable. However, it is not because two units of work are conflict free (e.g. have no common reduction variable) that they must be assigned to the same CFUW. Using this additional flexibility, another exemplary embodiment evaluates performance metrics such as data locality, cache performance metrics, or any other performance metrics that have an impact on the selection of given UW for a given of CFUW in order to determine advantageous sets of conflict free UW to belong to any given CFUWs. Further, the numbers of list builder thread can be fixed, vary over time depending on thread availability, work, load balancing and other considerations. Moreover, the number of UW in a CFUW can be fixed, or vary over time, or be sensitive to the number of conflicts detected. Furthermore, the numbers of UWs in a CFUW may be larger/smaller/equal to the number of worker threads in a pool.

Likewise, with respect to the functioning of worker threads (e.g., worker threads 140 of FIG. 2), worker threads are not constrained to pick up the CFUW in any order (for example, they could pick CFUW so as to minimize objectives, e.g., locality or some preference criteria . . . ). Within a CFUW, a worker thread can pick a UW in arbitrary order (for example, they could pick UW so as to minimize objectives such as locality or some preference criteria). The numbers of worker threads may vary over time as a function of load balancing issues, for example.

Figure 8:
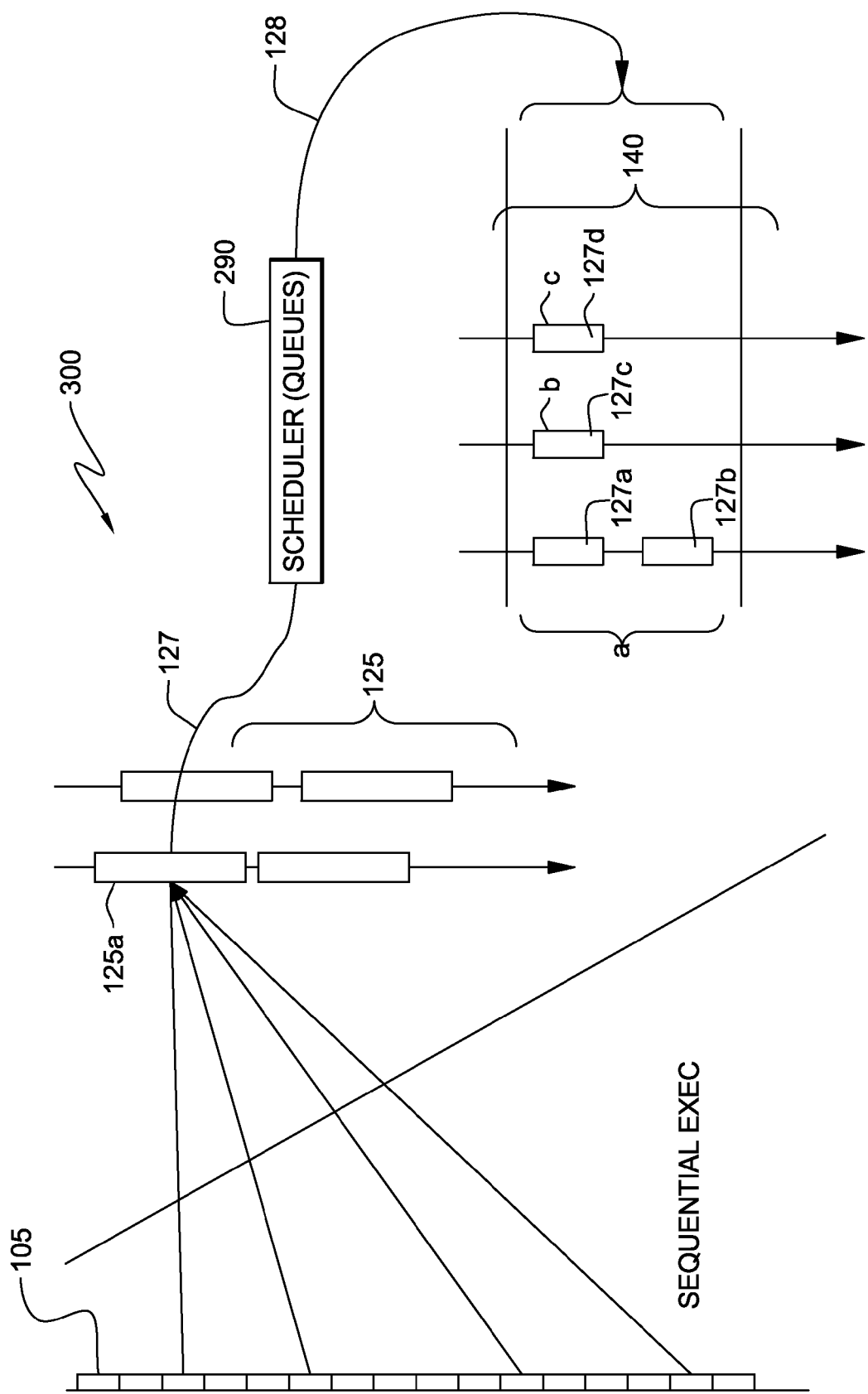
FIG. 8 depicts an operating multi-threaded environment 300 showing a conflict free list builder including two conflict free list builder threads working in parallel, selecting units of work according to a random selection; and, FIG. 9 illustrates an exemplary hardware configuration of a computing system 400 running and/or implementing the methods of the described embodiments.

FIG. 8 depicts an operating multi-threaded environment 300 showing, in an example embodiment, a conflict free list builder showing two conflict free list builder threads working in parallel, selecting units of work 105 according to a random selection. In one embodiment, the units of work 105 are shown operating sequentially, however the processing performed by conflict free list builder threads is parallelized to identify accesses to the same element. In FIG. 8, for example, the conflict-free list builder 125a has generated a CFUW of four UWs 127 which are passed to a scheduler process 290, such as operating in the computing system, for storage in a queue (with or without management). FIG. 8 further illustrates the implementation of worker threads 140a, . . . , 140c, that receive scheduler information for initiating processing on new CFUWs. In one embodiment, the three parallel operating worker threads 140a, . . . , 140c operate to process the CFUW either sequentially or in parallel. In the example shown, worker threads 140a indicate sequential processing of two UWs 127a, 127b within the CFUW. Also in the example, while the thread 140a works on UWs 127a and 127b, worker threads 140b and 140c work in parallel with thread 140a in order to process the two remaining UWs 127c and 127d. When all UWs within a given CFUW are finished they will retrieve the next CFUW from the scheduler queue. Thus, there is built at runtime and in parallel, units of work that are guaranteed to be conflict free. Each of these conflict-free units of work can then be run concurrently on the system, and without synchronization or fine grain locking mechanism.

As the method described does not require hardware support, therefore it can be practiced on current systems. Experiments performed show up to 30% improvement on existing systems when running reduction operations in, for example eight (8) parallel threads (8 cores).

Figure 9:
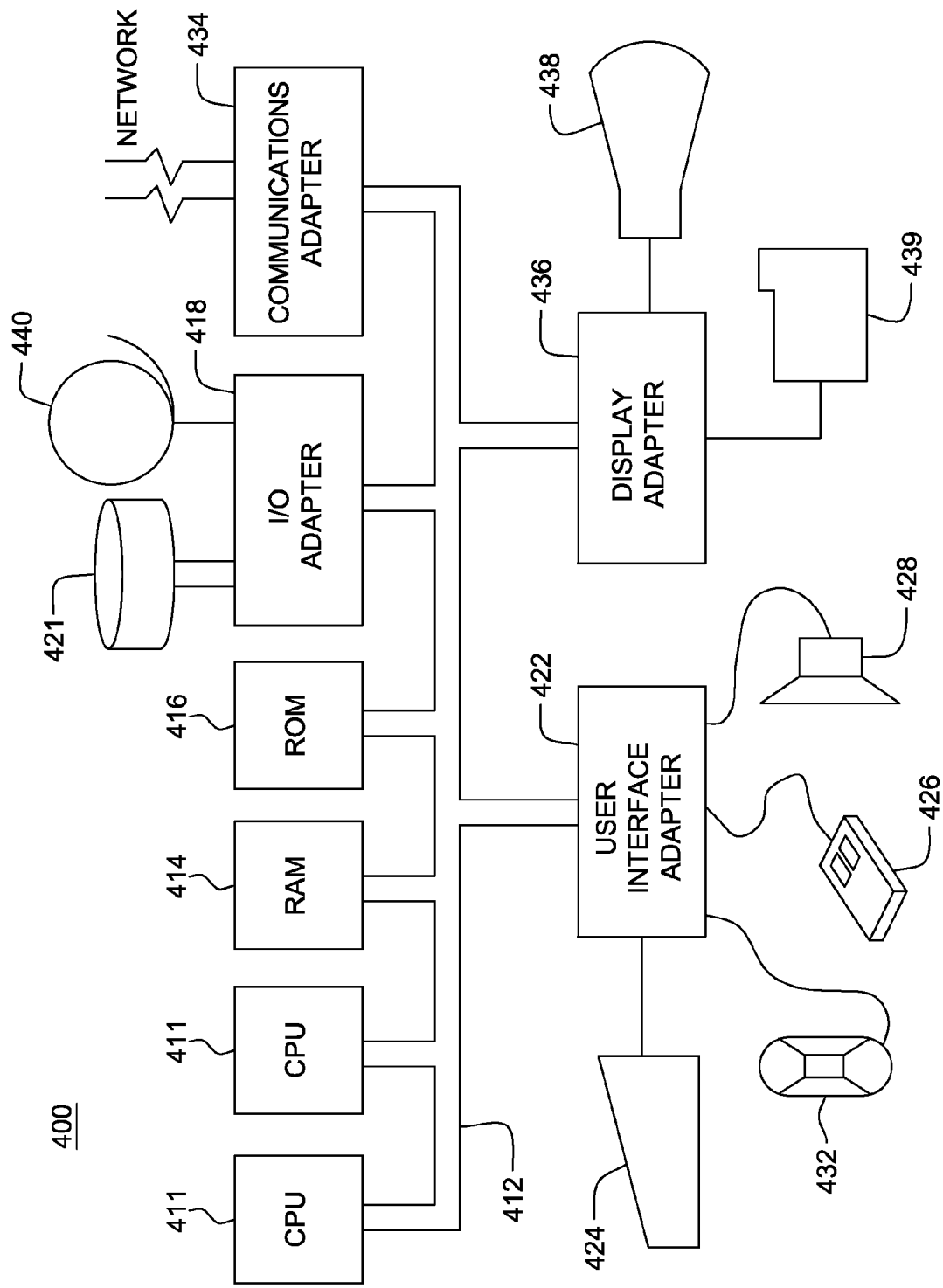

FIG. 9 illustrates an exemplary hardware configuration of a computing system 400 running and/or implementing the method steps in FIGS. 4, 5 and 8. The optimizing compiler may also be implemented on the hardware configuration illustrated in FIG. 9. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions runnable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method in a computer system for performing parallelization of irregular reductions, the method comprising:
   receiving, at a compiler device, a program;
   selecting, at compile time, at least one unit of work (UW) from said program, each said UW of work corresponding to a program loop iteration operation in which reduction variable instances are determined during a program run time, each UW configured to operate on at least one reduction operation, where at least one reduction operation in the UW operates on one or more reduction variable instances;
   and for each current selected UW:
   determining one or more reduction variable instances operated on by said current selected UW;
   recording, at run time, for said current selected UW, a list of reduction variable instances accessed by that current unit of work; and,
   determining, at run time, whether reduction variable instances accessed by the current selected UW conflict with any prior reduction variable instances recorded as having been accessed by prior selected units of work, and
   accumulating determined non-conflicting reduction variable instances as conflict free units of work (CFUW) when no conflicts are found,
   wherein accumulated CFUW are scheduled for parallel run-time operation by at least two or more processing threads.

2. The method as claimed in claim 1, wherein said conflict determining comprises:
   a) retrieving a first unprocessed unit of work (UW 1) at run time;
   b) adding UW 1 to a conflict free units of work queue for processing at run time c) generating a list of reductions touched by said UW 1; d) storing said list of reductions accessed by said UW 1 in a set; e) selecting a second unprocessed unit of work (UW 2); and, f) determining whether any reduction operations are touched by said UW 2;

g) testing whether any determined reduction value accessed by said UW 2 is already included in said set; and, h) if the determined reduction accessed by said UW 2 are not included in the set, adding each reduction touched by said UW 2 into the set; and i) assigning said UW 2 to said queue of conflict free units of work for processing at run time.

3. The method as claimed in claim 2, wherein if the determined reduction values accessed by said UW 2 are included in the set, reporting a failure of the UW 2.

4. The method as claimed in claim 3, further comprising: grouping said assigned units of work that are determined conflict free and, storing said group assigned CFUW in a memory device for parallel worker thread processing.

5. The method as claimed in claim 4, further including: determining whether there are a threshold number of units of work assigned as being conflict free in said memory device; and, if a threshold number is not attained, selecting a next successive unprocessed UW and repeating steps f)-i) for each successive unprocessed UW until said threshold number is attained.

6. The method as claimed in claim 2, wherein said set including reduction values accessed by a unit of work is stored in one of: a hash table, a bit vector or a linked list structure.

7. The method as claimed in claim 1, wherein said program operates at least one loop including a detectable pattern indicating multiple reduction operations to be performed at run time, each of said at least one unit of work including a number of iterations gathered from said loop, wherein multiple units of work are organized as a sequence of units, wherein said selecting a UW includes: selecting a UW from said sequence, wherein successive selections of UWs from said sequence includes non-contiguous UWs having non\-contiguous iterations as candidate for inclusion within CFUWs.

8. The method as claimed in claim 7, wherein said selecting a UW includes: randomly selecting an UW having iteration loops as candidate for inclusion within CFUWs.

9. The method as claimed in claim 5, wherein said memory device comprises a memory queue structure, said at least two or more processing threads being worker threads that operate on said assigned conflict free UW in said memory queue.

10. The method as claimed in claim 1, wherein prior to selecting a UW, forming said at least one or more units of work (UW), wherein a UW is formed to process multiple iterations that account for data locality.

11. The method as claimed in claim 1, wherein said program operates multiple loops, each loop of said multiple loop including a detectable pattern indicating multiple reduction operations to be performed at run time, each UW corresponding to a loop, said method further including:

determining whether said detectable pattern indicating multiple reduction operations does not change for each said UW, and if determined that said detectable pattern indicating reduction operations does not change, assigning a CFUW for each said UW having non-conflicting reduction operations;

storing all of the conflict free units of work in a memory storage device; and, subsequently, retrieving said stored conflict free units of work from said memory storage device and initiating working threads that consume said retrieved CFUW.

12. The method as claimed in claim 11, wherein, if determined that a detectable pattern indicating a reduction operation for access by a current UW has changed from a prior iteration, then determining whether reduction operations accessed by said current UW conflict with any reduction operations recorded as having been accessed by prior selected units of work, and assigning said unit of work as a conflict free unit of work (CFUW) when no conflicts are found.

13. A system for optimizing a program, the system comprising:

a memory;

a processor coupled to said memory, said processor running program instructions for performing parallelization of irregular reductions, said method comprising:

receiving an input program;

selecting, at compile time, at least one unit of work (UW) from said program, each said UW of work corresponding to a program loop iteration operation in which reduction variable instances are determined during a program run time, each UW configured to operate on at least one reduction operation, where at least one reduction operation in the UW operates on one or more reduction variable instances;

and for each current selected UW:

determining one or more reduction variable instances operated on by said current selected UW;

recording, at run time, for said current selected UW, a list of reduction variable instances accessed by that current unit of work; and, determining, at run time, whether reduction variable instances accessed by the current selected UW conflict with any prior reduction variable instances recorded as having been accessed by prior selected units of work, and accumulating determined non-conflicting reduction variable instances as conflict free units of work (CFUW) when no conflicts are found, wherein accumulated CFUW are scheduled for parallel run-time operation by at least two or more processing threads.

14. The system as claimed in claim 13, wherein said conflict determining comprises:

a) retrieving a first unprocessed unit of work (UW 1) at run time;

b) adding UW 1 to a conflict free units of work queue for processing at run time c) generating a list of reductions touched by said UW 1;

d) storing said list of reductions accessed by said UW 1 in a set;

e) selecting a second unprocessed unit of work (UW 2); and, f) determining whether any reduction operations are touched by said UW 2;

g) testing whether any determined reduction value accessed by said UW 2 is already included in said set; and, h) if the determined reduction accessed by said UW 2 are not included in the set, adding each reduction touched by said UW 2 into the set; and i) assigning said UW 2 to said queue of conflict free units of work for processing at run time.

15. The system as claimed in claim 14, wherein if the determined reduction values accessed by said UW 2 are included in the set, reporting a failure of the UW 2.

16. The system as claimed in claim 15, wherein said method further comprises: grouping said assigned units of work that are determined conflict free and, storing said group assigned CFUW in a memory device for parallel thread processing.

17. The system as claimed in claim 16, wherein said method further comprises: determining whether there are a threshold number of units of work assigned as being conflict free in said memory device; and, if a threshold number is not attained, selecting a next successive unprocessed UW and repeating steps f)-i) for each successive unprocessed UW until said threshold number is attained.

18. The system as claimed in claim 14, wherein said set including reduction values accessed by a unit of work is stored in one of: a hash table, a bit vector or a linked list structure.

19. The system as claimed in claim 13, wherein said input program includes an iterative loop comprising multiple iterations, wherein multiple units of work are formed as a sequence of units, each unit for handling a predetermined contiguous number of loop iterations,
wherein said selecting a UW includes: selecting a UW from said sequence, wherein successive selections of UWs from said sequence includes non-contiguous UWs having non\-contiguous iterations as candidate for inclusion within CFUWs.

20. The system as claimed in claim 19, wherein said selecting a UW includes: random selecting an UW having iteration loops as candidate for inclusion within CFUWs.

21. The system as claimed in claim 17, wherein said memory device comprises a memory queue structure, said at least two or more processing threads being worker threads that operate on said assigned conflict free UW in said memory queue.

22. The system as claimed in claim 13, wherein prior to said selecting a UW, forming said at least one or more units of work (UW), wherein a UW is formed to process multiple iterations that account for data locality.

23. The system as claimed in claim 13, wherein said program operates multiple loops, each loop of said multiple loop including a detectable pattern indicating multiple reduction operations to be performed at run time, each UW corresponding to a loop, said method further comprises:
determining whether said detectable pattern indicating multiple reduction operations does not change for each said UW, and
if determined that said detectable pattern indicating reduction operations does not change, assigning a CFUW for each said UW having non-conflicting reduction operations;
storing all of the conflict free units of work in a memory storage device; and,
subsequently, retrieving said stored conflict free units of work from said memory storage device and initiating working threads that consume CFUW.

24. A computer program product for performing parallelization of irregular reductions, the computer program product comprising:
a storage media, wherein said storage media is not only a propagating signal, said storage media readable by a processing circuit and storing instructions for operation by the processing circuit for performing a method comprising:
receiving an input program;
selecting, at compile time, at least one unit of work (UW) from said program, each said UW of work corresponding to a program loop iteration operation in which reduction variable instances are determined during a program run time, each UW configured to operate on at least one reduction operation, where at least one reduction operation in the UW operates on one or more reduction variable instances; and for each current selected UW:
determining one or more reduction variable instances operated on by said current selected UW;
recording, at run time, for said current selected UW, a list of reduction variable instances accessed by that current unit of work; and,
determining, at run time, whether reduction variable instances accessed by the current selected UW conflict with any prior reduction variable instances recorded as having been accessed by prior selected units of work, and accumulating determined non-conflicting reduction variable instances as conflict free units of work (CFUW) when no conflicts are found,
wherein accumulated CFUW are scheduled for parallel run-time operation by at least two or more processing threads.

25. The computer program product as claimed in claim 24, wherein said conflict determining comprises:
a) retrieving a first unprocessed unit of work (UW 1) at run time;
b) adding UW 1 to a conflict free units of work queue for processing at run time
c) generating a list of reductions touched by said UW 1;
d) storing said list of reductions accessed by said UW 1 in a set;
e) selecting a second unprocessed unit of work (UW 2); and,
f) determining whether any reduction operations are touched by said UW 2;
g) testing whether any determined reduction value accessed by said UW 2 is already included in said set; and,
h) if the determined reduction accessed by said UW 2 are not included in the set, adding each reduction touched by said UW 2 into the set; and
i) assigning said UW 2 to said queue of conflict free units of work for processing at run time.

* * * * *